(12) United States Patent
Fucich et al.

(10) Patent No.: US 12,434,189 B2
(45) Date of Patent: Oct. 7, 2025

(54) AIR PURIFYING PHOTOBIOREACTOR TO IMPROVE INDOOR AIR QUALITY

(71) Applicant: AlgenAir, Inc., Pittsburgh, PA (US)

(72) Inventors: Daniel C. Fucich, Pittsburgh, PA (US); Kelsey M. Abernathy, Columbia, MD (US)

(73) Assignee: AlgenAir, Inc., Pittsburgh, PA (US)

( * ) Notice: Subject to any disclaimer, the term of this patent is extended or adjusted under 35 U.S.C. 154(b) by 235 days.

(21) Appl. No.: 18/217,806

(22) Filed: Jul. 3, 2023

(65) Prior Publication Data

US 2024/0001298 A1  Jan. 4, 2024

Related U.S. Application Data

(63) Continuation of application No. 16/854,055, filed on Apr. 21, 2020, now abandoned.

(60) Provisional application No. 62/920,768, filed on May 15, 2019.

(51) Int. Cl.
| | | |
|---|---|---|
| *B01D 53/84* | (2006.01) | |
| *C12M 1/00* | (2006.01) | |
| *C12N 1/12* | (2006.01) | |

(52) U.S. Cl.
CPC ............ *B01D 53/84* (2013.01); *C12M 21/02* (2013.01); *C12M 29/24* (2013.01); *C12N 1/12* (2013.01); *B01D 2251/95* (2013.01)

(58) Field of Classification Search
CPC .... B01D 53/84; B01D 2251/95; C12M 21/02; C12M 29/24; C12M 31/10; C12M 31/02; C12M 31/08; C12M 31/12; C12M 31/00; C12M 23/06; C12M 23/22; C12N 1/12; C12N 1/10; C12N 1/20; C12N 13/00; C02F 3/32; C12P 5/023; C12P 7/649; A01G 33/00; Y02E 50/13; Y02E 50/343
USPC ............................................. 435/266; 47/1.4
See application file for complete search history.

(56) References Cited

U.S. PATENT DOCUMENTS

| | | | | |
|---|---|---|---|---|
| 8,507,264 | B2 | 8/2013 | Lewnard et al. | |
| 8,569,050 | B1* | 10/2013 | Ericsson | C12M 21/02 |
| | | | | 435/292.1 |
| 9,521,725 | B2 | 12/2016 | Woytowitz | |
| 2009/0130704 | A1* | 5/2009 | Gyure | C12M 39/00 |
| | | | | 435/292.1 |
| 2013/0344574 | A1* | 12/2013 | Morgan | C12M 23/06 |
| | | | | 435/257.1 |
| 2014/0242681 | A1* | 8/2014 | Fiorentino | C12M 23/06 |
| | | | | 435/292.1 |

(Continued)

FOREIGN PATENT DOCUMENTS

| | | |
|---|---|---|
| CN | 204227560 U | 3/2015 |
| CN | 104645799 A | 5/2015 |

(Continued)

*Primary Examiner* — Michael L Hobbs
*Assistant Examiner* — Lenora A Abel
(74) *Attorney, Agent, or Firm* — U. Maryland Carey School of Law

(57) ABSTRACT

This invention is a bioreactor device adapted to improve air quality. The bioreactor consists of a base that houses the mechanical components and a vessel that holds liquid mixture of water, a photosynthetic microorganism, and a media. The bioreactor has an air pump which draws room air into the base of the device through an air filter. The bioreactor bubbles the air through the liquid mixture. Photosynthesis converts the carbon dioxide to oxygen.

14 Claims, 5 Drawing Sheets

(56) References Cited

U.S. PATENT DOCUMENTS

2017/0362561 A1\* 12/2017 Chung .................. C12M 21/02
2019/0127675 A1    5/2019 Adams et al.

FOREIGN PATENT DOCUMENTS

| CN | 206157161 U | 5/2017 | | |
|---|---|---|---|---|
| JP | H08206434 A | 8/1996 | | |
| WO | WO-2017074959 A1 \* | 5/2017 | ............. | B01D 53/84 |

\* cited by examiner

AIR PURIFYING PHOTOBIOREACTOR TO IMPROVE INDOOR AIR QUALITY

BACKGROUND

With the rise of Leadership in Energy and Environmental Design (LEED) buildings, heating, ventilation, and air conditioning (HVAC) units are designed to recirculate air while consuming less energy. As a result, less fresh oxygenated air replaces the indoor air. Carbon dioxide and other airborne contaminants accumulate indoors because of the decrease of fresh air exchange. This accumulation of airborne contamination can cause a condition for the building's occupants sometimes referred to as Sick Building Syndrome. Conventional air purifiers can remove some air contaminants, such as particulate matter and mold spores, but do not actively remove carbon dioxide or generate oxygen.

DETAILED DESCRIPTION

The present invention will be described in preferred embodiments. The invention may, however, be embodied in many different forms and should not be construed as being limited to the embodiments set forth herein; rather, these embodiments are provided so that this disclosure will be thorough and complete, and will fully convey the concept of the invention to those skilled in the art.

The device and method described herein are designed to remove air contaminants while also removing carbon dioxide and generating oxygen. An embodiment uses microalgae grown in a liquid medium to actively improve indoor air quality. House plants convert carbon dioxide to oxygen, but this device performs the conversion more efficiently. A 1.7-liter-sized embodiment of this device can reduce carbon dioxide at a rate equivalent to 25 house plants.

Various embodiments of the invention describe a photobioreactor designed to grow photosynthetic microorganisms for air purification. In particular embodiments, the photosynthetic microorganisms may be microalgae. Other embodiments can utilize various types of microalgae such as cyanobacteria as the photosynthetic microorganism.

Overview of the Device

Figure 1:
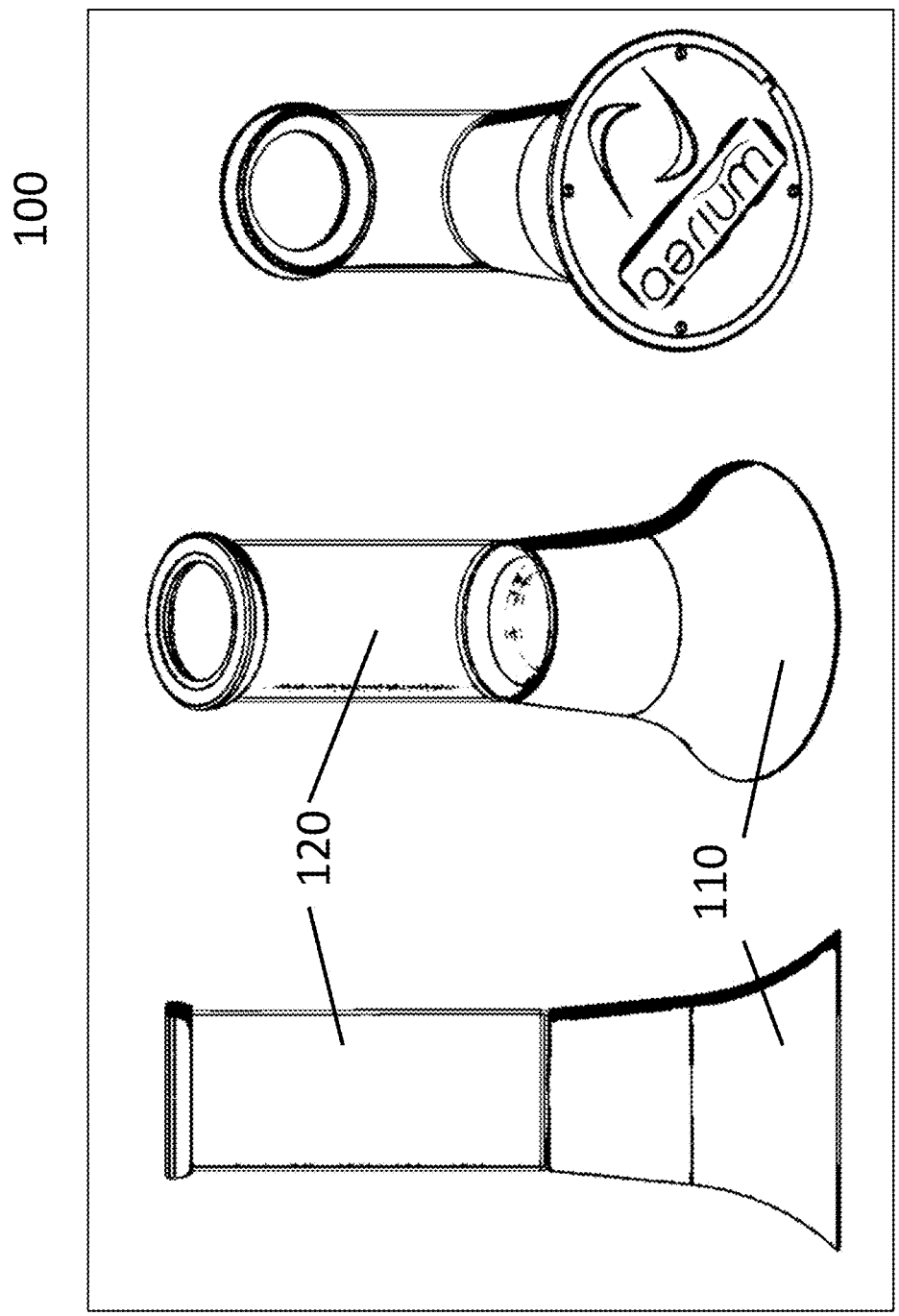
FIG. 1 shows three perspectives of an embodiment of the device.

In a particular embodiment, shown in FIG. 1, the photobioreactor 100 utilizes two main parts; a base 110 and a transparent liquid-holding vessel 120, hereinafter referred to as a "vase" 120. The vase 120 rests on the base 110 to form the body of the device. The vase 120 contains a liquid mixture of water, microalgae, and media (not shown).

The vase 120 includes a one-way valve 310 that fits into a base grommet 320 when the vase 120 is placed on the base 110. The vase 120 may be readily removed from the base 110. The one-way valve 310 prevents liquid from exiting the vase 120 while allowing air to flow into the vase. The valve 310 and grommet 320 will be discussed in greater detail below.

Another embodiment of the device is visually similar to the previous embodiment, except the vase 120 is not readily removable. A one-way valve 310 is connected between the vase 120 and an air pump 330.

Function

Figure 2:
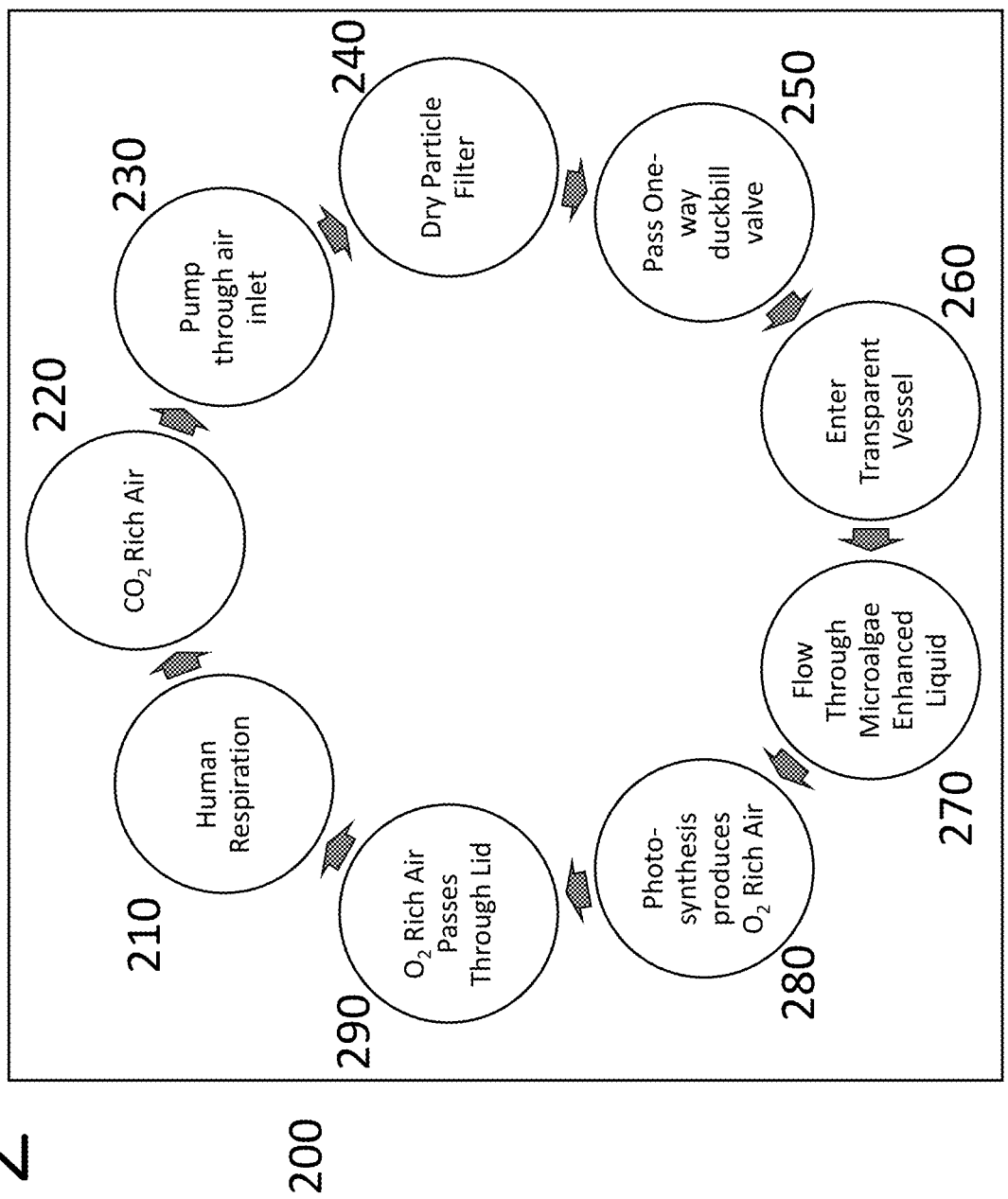
FIG. 2 illustrates a method of the device, according to an embodiment.

FIG. 2 demonstrates a basic example of a room's air cycle 200 in an embodiment. The device 100 removes airborne contaminants. Some examples of airborne contaminants the device removes include mold spores, dust, bacteria, carbon dioxide ($CO_2$), nitrogen dioxide ($NO_2$), sulfur dioxide ($SO_2$), or volatile organic chemicals, such as toluene. The device 100 also converts $CO_2$-rich air into $O_2$-rich air. Human respiration converts $O_2$ into $CO_2$ which increases the $CO_2$ in a room. The other airborne contaminants are naturally occurring in a room.

The device accomplishes both airborne contaminant removal and producing $O_2$ enriched air by drawing indoor air through at least one air inlet 340 in the side and/or bottom of the base. A dry-particle filter 350 filters some airborne contaminants before a pump 330 directs the air through a grommet 320 and a one-way valve 310 to enter the vase 120. The pretreated air flows through a liquid microalgae mixture. The microalgae uses photosynthesis to convert $CO_2$ into $O_2$. The filtered $O_2$-rich air passes through the lid 500 and into the room which improves air quality. The various components are described in more detail in paragraphs 019-026.

The air purification process is illustrated in the embodiment of FIG. 2. The air purification process 200 of an embodiment of the invention is a cycle beginning with human respiration within an indoor space 210. Human respiration produces $CO_2$ rich air 220. An air pump within the device 100 draws the $CO_2$ rich air through an air inlet in the device 230. A dry particle filter pre-filters the air 240 to remove gross particulates. The pump directs the air through a one-way valve 250 into the vase 260. The air flows through a microalgae-enriched liquid 270. The microalgae uses the $CO_2$ in a photosynthesis reaction which produces $O_2$ 280. The $O_2$ rich air passes through a lid on top of the vase back into the room 290.

The Base

Figure 3:
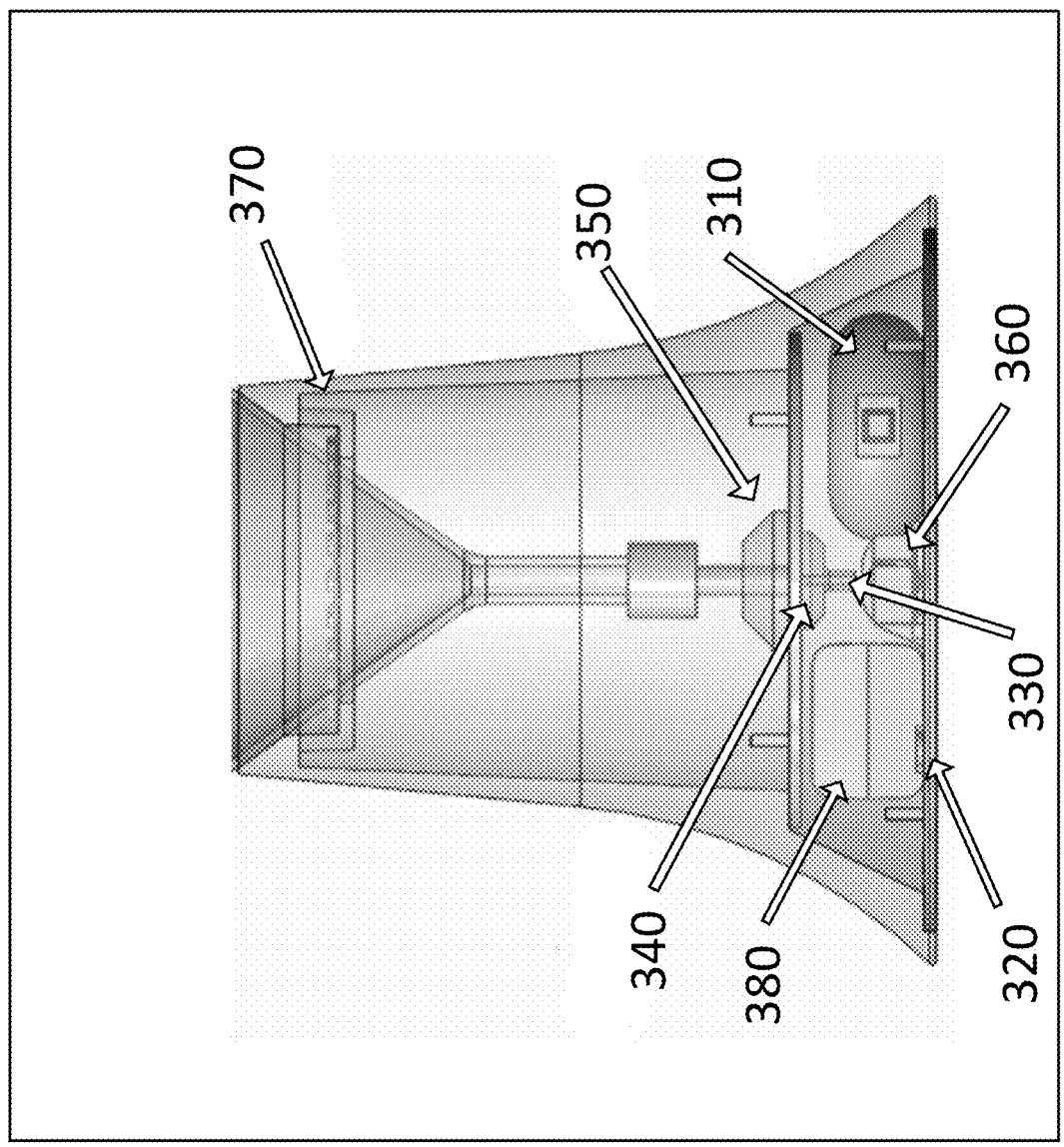
FIG. 3 is the base of the device and the internal parts, according to an embodiment.

The hollow base 110 may house a plurality of internal parts, shown in the embodiment of FIG. 3. An air pump 330 may draw air through at least one air inlet 340. From the air pump 330, the air travels through a hose or tube 360, an inline particle filter 350, and a self-sealing grommet 320.

The base 110 may house the electrical components that control the operation of the device. A circuit board 370 controls the air pump 330 and a ring of LED lights 380, setting the speed of the air flow and the luminosity of the light respectively. The LED lights 380 may be powered by a LED driver or low voltage transformer 390, either on the circuit board 370 or located separately. Other embodiments of the device use at least one incandescent light bulb. The device may utilize the LED, fluorescent, or incandescent light for the algae to use as a light source during photosynthesis. The device may also use any known or future-developed light source which supports photosynthesis. The device may have an electrical cord drawing standard household power (typically 110-120 VAC) to power the device. Other embodiments of the device use other standard forms of energy. For example, solar panels or battery powered. In some embodiments, sensors described in paragraph 036 are housed in the base.

The Vase

Figure 4:
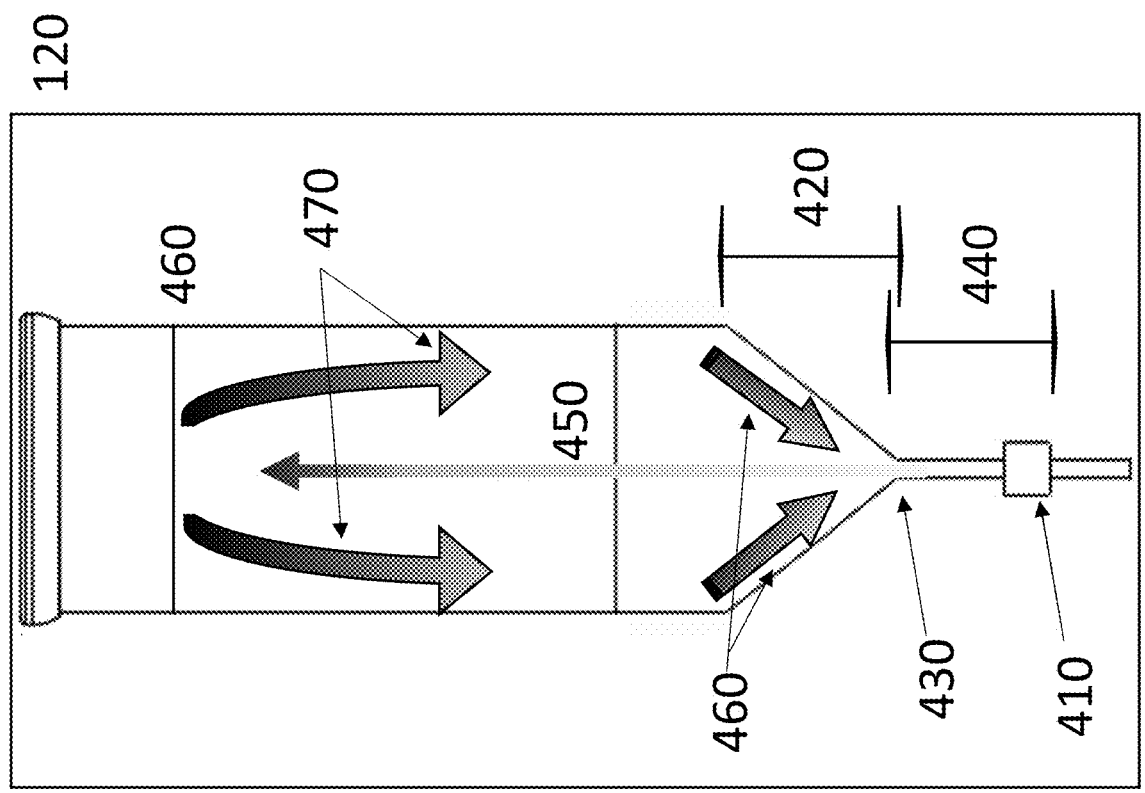
FIG. 4 illustrates an air lift system within the vase, according to an embodiment.

FIG. 4 demonstrates an embodiment of the vase 120. The shape of the vase may be substantially cylindrical with a funnel-shaped bottom of the vase 420. The vase has a small diameter opening 430 and a short tube at the bottom of the funnel 440. The vase is constructed of a transparent material capable of containing the liquid mixture. For example, the vase 120 may be constructed of glass. In another embodiment the vase 420 may be clear plastic. A one-way valve 310 connects to the end of the short tube 440. One embodiment uses a 3-piece valve 310 that connects to the vase 120 by a threaded fitting, the three parts being a bib, a threaded housing, and a diaphragm. One embodiment of the invention uses a duckbill valve for the one-way valve 310. Other embodiments may use a snap-on connector, a friction-based connection, or any other connection type that will secure the one-way valve 310 to the vase 120. A person skilled in the art would be able to select from these or other known valves to prevent the water in the vase 120 from exiting down into the base 110.

Another embodiment of the device does not have a readily removable vase 120. This embodiment includes a one-way valve 310 beyond the air pump 330 to prevent the liquid mixture from exiting the vase 120 into the base 110.

Figure 5:
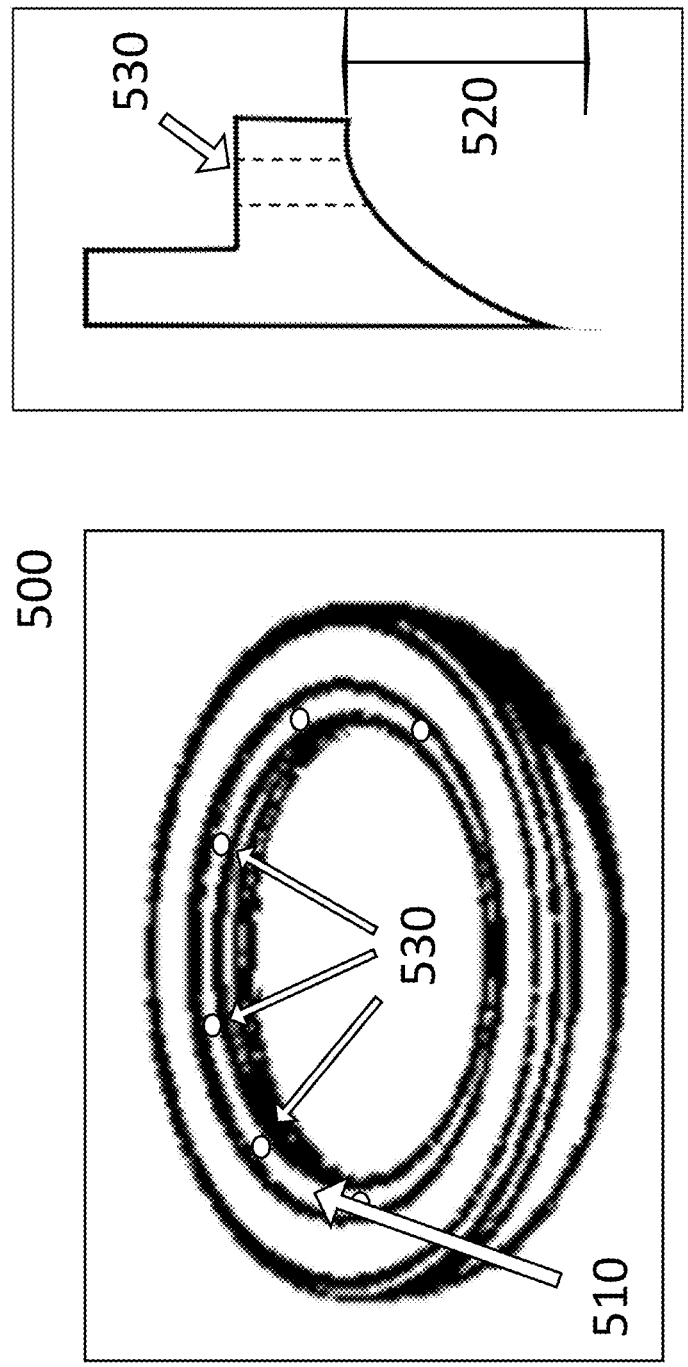
FIG. 5 is an overhead and side view of the removable lid, according to an embodiment.

A removable lid 500, shown in FIG. 5, may be attached to the top of the vase 120. An embodiment of the device uses a silicone ring for the lid 500 with a recess 510 for a paper filter (not shown). One side of the filter has a hydrophobic coating to reduce condensation from pooling on the inside of the lid 500. The interior portion of the lid 500 may be partially dome-shaped 520 to prevent splashing, turbulence, and/or condensation from collecting then dripping down the external sides of the vase 120. The lid 500 may have holes 530 distributed around the lower-inside portion that help prevent condensation from pooling on the inside of the lid 500 by allowing the liquid to drain back into the vase 120.

The lid 500 can use any filter or material that supports gas exchange while also preventing biological and particulate matter from entering the vase 120. For example, in an embodiment, the filter may be a membrane material. A person skilled in the art may select any filter which permits gas exchange while preventing biological and particulate matter contamination of the media.

The Liquid Mixture

In an embodiment of the invention, to prepare a liquid mixture (not shown) for a 1.7-liter vase 120, a user dilutes 16 ounces of a microalgal food in 48 ounces of water. The user then adds the diluted food and 4-8 ounces of media to the liquid. The user fills the rest of the vase 120 with water. These amounts work out to volumetric ratios of approximately one-fourth microalgal food, one-sixteenth media, and eleven-sixteenths water. The water should be deionized, filtered, or bottled. In most embodiments, tap water may not be used. These numbers provided are provided to give an approximate amount of media and food and is not intended to be an exact formulation. The device can function properly with less media or microalgae. Providing less media will require changing the liquid more frequently. Providing less microalgae will increase the activation time of the algae. More of either the media or algae will not harm the device, but does increase the cost to the user.

The device may utilize standard photosynthetic microorganisms or microalgae types, such as the type which can be purchased from scientific lab suppliers. The device may also utilize specially-designed photosynthetic microorganisms or algae. For example, the microorganism could be nannochloropsis, chlorella, other eukaryotic algae, and many other strains of cyanobacteria such as *Synechococcus* or *Spirulina*. In alternative embodiments, macroalgae may be used.

Operation of the Device

In an embodiment of the invention, the device functions by creating an air lift system within the vase 120, shown in FIG. 4. The shape of the vase 120 enhances the air lift system for the microalgae to flow through the liquid in the vase 120. The pump's (330) required minimum air flow is enough flow to achieve the 'air lift system.' In an embodiment, the air flow for a 1.7-liter is approximately 500 mL/minute, but varies widely depending on the size and shape of the vase 120. A person skilled in the art would be able to adjust the air flow to suit a different sized or shaped vase 120.

The air pump 330 creates the air lift system by pushing air small bubbles through the vase tube 440. Creating smaller air bubbles increases the total surface area of the air bubbles. The air bubbles interface with the microalgae and $CO_2$ is dissolved. The air bubbles lift the algae 450 to the surface of the liquid 460, which generates turbulence. The microalgae flows to the internal walls of the vase and then down the walls 470. The funnel 420 concentrates the media 460 at the bottom of the vase 120 where the microalgae flow cycle starts again. This flow path prevents stagnation of the culture to reduce biofouling and cellular shading.

A light 380 in the base 110 promotes microalgae growth through photosynthesis.

Media Replacement

In an embodiment of the invention, a user may periodically replace the liquid mixture in the vase 120. The replacement period is not necessarily defined by a specific time, but rather when the microalgae has been exhausted or has reached carrying capacity. In an embodiment, one indicator of the microalgae being exhausted or having reach carrying capacity may be when the liquid color reaches a dark color, such as dark-green hue. The user empties the vase contents when the microalgae has been exhausted or has reached carrying capacity. In one embodiment the user is provided with a color indicator, such as may be printed on a card or label, to determine when the user should change the liquid. The user may compare the liquid color to the printed color and use this comparison to determine whether replacement is necessary.

Some embodiments of the device may use sensors to control the device and determine the replacement period. For example, a spectrophotometer may be used to determine the density of the algae. When the algae density exceeds 3 Optical Density Units (OD) at 680 nm and/or 6 grams per liter, the device alerts the user to change the algae. These numbers may change depending on the species of microorganism and its pigmentation profile. The device may monitor the health of the algae based on data received from a $CO_2$ sensor, an $O_2$ sensor, a thermal sensor, and/or a humidity sensor. The device may control and/or indicate the health of the algae based on the sensor data by adjusting the air pump flow, the light intensity, and/or a thermal element.

In an embodiment of the invention, the user removes the vase 120 from the base 110 to dispose of the liquid. The user can usually dispose of the contents into a standard sanitary sewer in most jurisdictions after the algae have been sterilized. However, the user should consult with local authorities first.

After disposing of the contents, the user rinses the vase 120 of any remnant liquids or solids. The user prepares a new batch using water, diluted microalgae media, and microalgae as described in paragraphs 027-029. The user then powers on the device to let the new batch of microalgae grow and convert $CO_2$ into $O_2$.

We claim:

1. A photobioreactor device adapted to improve indoor air quality, the photobioreactor comprising:
   a base;
   a liquid-holding vessel connected to the base; and
   a lid on the vessel,
   the base comprising:
      a bottom,
      walls extending from the bottom,
      a cavity encapsulated by the walls, the bottom, and the liquid-holding vessel having an outer edge abutting the walls,
      an air pump, at least one air inlet, an electronic control mechanism, and a light source controlled by the electric control mechanism,
      wherein the air pump is positioned within the cavity,
      wherein the air inlet(s) are configured to permit the air pump to draw indoor air from outside the device through the base into the pump, and
      wherein the light source is positioned at the outer edge of the cavity flush with the outer edge that would come into contact with the liquid-holding vessel, taking the form of a single light element shaped like a continuous ring and directed from the base into the vessel,
   the vessel configured to hold a liquid mixture and having a cylindrical shape, an opening at the top of the vessel, and a bottom shaped to converge to a small opening at the top of the base,
   the small opening connected to a one-way valve, the valve configured to admit the indoor air drawn by the air pump from outside the device into the vessel,
   wherein the vessel is separable from the base and the one-way valve connects with a tube connected to the air pump,
   the liquid mixture comprising water, a photosynthetic microorganism, and a media, and
   the lid configured to attach to the top opening of the vessel.

2. The photobioreactor of claim 1, further comprising a dry-particle air filter positioned within the base cavity and connected to the air pump.

3. The photobioreactor of claim 1, wherein the light source comprises an incandescent bulb.

4. The photobioreactor of claim 1, wherein the light source comprises a light emitting diode (LED).

5. The photobioreactor of claim 4, wherein the LED is powered via a low-voltage transformer.

6. The photobioreactor of claim 1, wherein the light source comprises a fluorescent bulb.

7. The photobioreactor of claim 1, wherein the lid is dome-shaped.

8. The photobioreactor of claim 1, wherein the lid is at least partly constructed of a material that permits gas exchange.

9. The photobioreactor of claim 1, wherein the lid has a plurality of holes to drain liquid from the lid into the vessel.

10. The photobioreactor of claim 1, wherein the photosynthetic microorganism is a type of microalgae.

11. The photobioreactor of claim 1, wherein the light source comprises natural light.

12. A method of indoor air purification, comprising:
   growing a photosynthetic microorganism in a photobioreactor, wherein the photobioreactor comprises:
      a liquid-holding vessel,
      a base having
         a bottom,
         walls extending from the bottom,
         a cavity encapsulated by the walls, the bottom, and the liquid-holding vessel, and
         an air pump, an electronic control mechanism, and a light source controlled by the electric control mechanism located within the cavity;
   producing oxygen through photosynthesis of the microorganism;
   drawing indoor air from outside the device via the air pump into the base;
   percolating the indoor air through the photobioreactor; and
   removing airborne contaminants in the indoor air by interaction of the indoor air with the microorganism while circulating the microorganism through the photobioreactor.

13. The method of indoor air purification of claim 12, further comprising the step of filtering the indoor air through a dry-particle filter.

14. The method of indoor air purification of claim 12, wherein the percolating of the indoor air through the photobioreactor comprises lifting, by the indoor air, of the indoor air lifting the microorganism to the surface of the liquid.

* * * * *